July 23, 1940.   S. G. RUSSELL ET AL   2,208,805
LEVEL WIND FISHING REEL
Filed Sept. 11, 1935
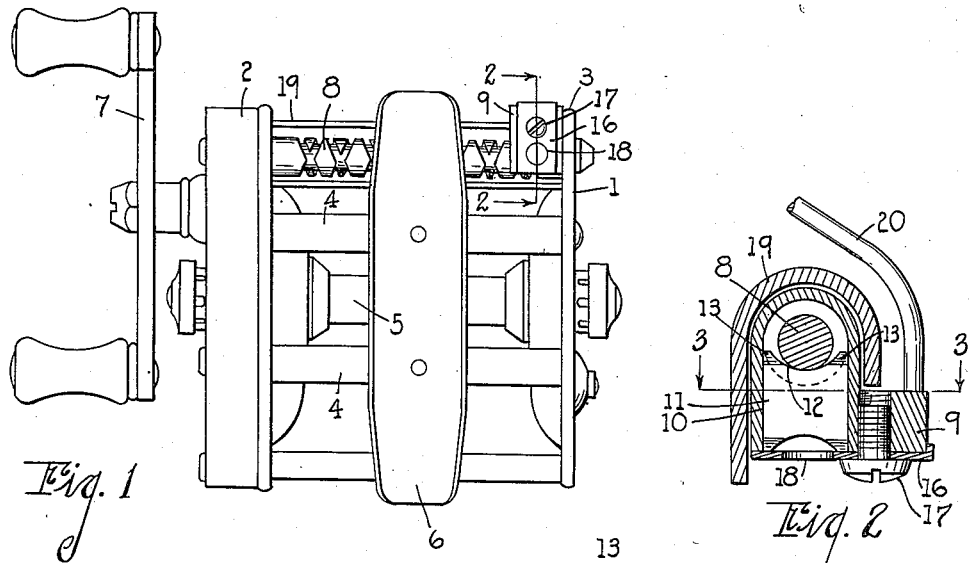
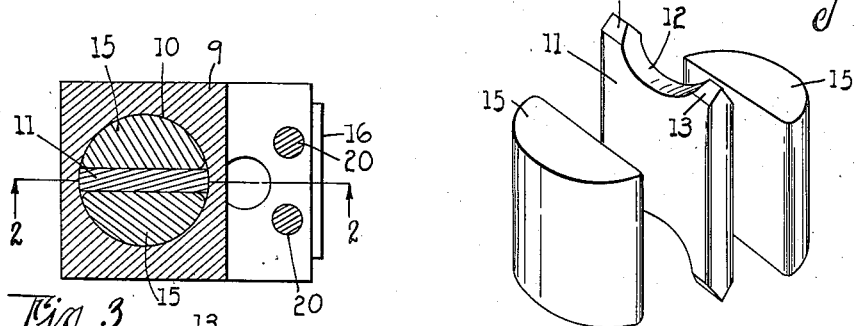
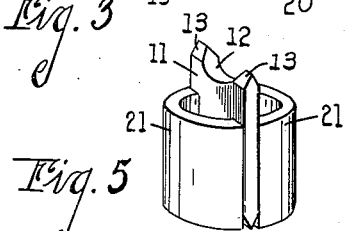
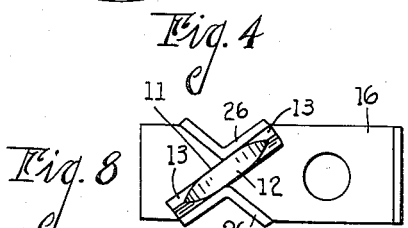
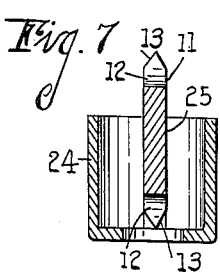
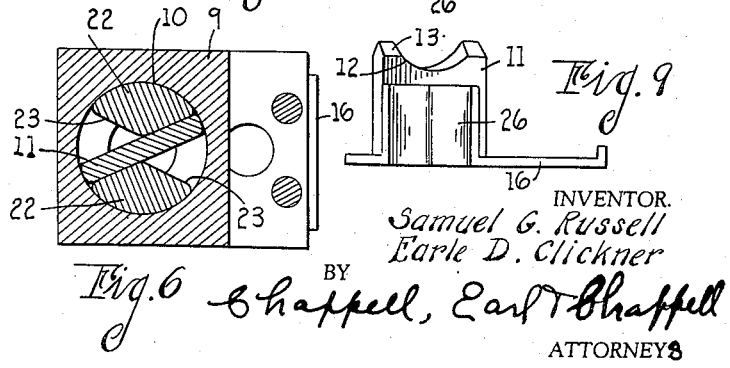
INVENTOR.
Samuel G. Russell
Earle D. Clickner
BY Chappell, Earl T Chappell
ATTORNEYS Patented July 23, 1940

2,208,805

UNITED STATES PATENT OFFICE 2,208,805

LEVEL WIND FISHING REEL

Samuel G. Russell and Earle D. Clickner, Kalamazoo, Mich., assignors to Shakespeare Company, Kalamazoo, Mich.

Application September 11, 1935, Serial No. 40,057

6 Claims. (Cl. 242—84.4)

This invention relates to improvements in level wind fishing reels.

The main objects of this invention are:

First, to provide an improved pawl assembly for a level wind fishing reel, characterized by the freedom of action thereof during the oscillation of the pawl.

Second, to provide a pawl and pawl carrier of the class described which is very durable.

Objects relating to details and economies of the invention will appear from the description to follow. The invention is defined and pointed out in the claims.

Preferred embodiments of the invention are illustrated in the accompanying drawing, in which:

Fig. 1 shows a bottom plan view of a level wind fishing reel to which the invention is applied.

Fig. 2 is an enlarged sectional view taken on the line 2—2 of Figs. 1 and 3.

Fig. 3 is a sectional view taken on line 3—3 of Fig. 2.

Fig. 4 is a perspective view showing the elements of the improved pawl in disassembled relation.

Fig. 5 is a perspective view of a modification contemplated by the invention.

Fig. 6 is a sectional view similar to that of Fig. 3, illustrating a further modification.

Fig. 7 is an elevational sectional view of a further modification.

Fig. 8 is a plan view of a still further modification.

Fig. 9 is an elevational view of the modification illustrated in Fig. 8.

The pawl structure which forms the subject matter of this application is characterized by the fact that there is no tendency for the operating member which engages the traversing carriage to bind at any point thereof and particularly at the extreme ends of the traversing shaft. There is also a freedom of movement of the operating member in its socket, which constitutes a decided improvement over known structures of this nature, for instance, the reel illustrated in the patent to Clickner, No. 1,965,174 of July 3, 1934.

By this invention, we have provided a pawl composed of a plurality of parts, thus enabling any part which becomes defective due to wear thereof to be readily replaced without the necessity of replacing the entire pawl, which is the case if the pawl is an integral piece.

A reversible pawl is provided, i. e., one which carries a shaft engaging face at either end thereof so that it may be turned about when one face becomes worn. This general type of pawl is shown in the patent to Clickner, No. 1,965,174, referred to, but our structure has a further advantage over the structure disclosed in that patent in that the shaft engaging face which is not in engagement with the traversing shaft is carried inside the traversing carriage, with the result that an exposed moving part is obviated.

In the drawing, the reference numeral 1 indicates a level wind fishing reel having head and tail members 2, 3, pillars 4, spool 5, reel seat plate 6 and crank 7. The conventional reversely threaded line guide carriage traversing shaft 8 is likewise provided.

The reference numeral 9 indicates a line guide carriage slidable along the shaft 8, which is bored out to provide a pawl socket 10 and cross bored to receive the shaft 8. The line guide carriage pawl 11 is in the form of a flat generally rectangular disk or plate having concave faces 12 at each end selectively engageable with the threads of the traversing shaft, there being A-shaped prongs 13 at each side of the concave portion which act as guides in reversing the pawl at the end of the threads. The pawl is supported for free oscillating movement by means of the segmental bearing or supporting blocks 15 (see the embodiment shown in Figs. 1 to 4 inclusive), these bearing blocks or support members being freely rotatable or oscillatable in the socket, and the pawl and supports constitute complementary parts of a cylindrical pawl unit.

Below the pawl and pawl socket, we secure a retaining plate or clip 16 to the carriage 9 by means of a screw 17. The retaining plate holds the pawl member and pawl supports in the socket 10 with the engaging face 12 of the pawl in the grooves of the shaft 8. The retaining plate 16 is provided with an aperture 18 for the purpose of lubricating the pawl if desired. Surrounding the shaft and pawl structure, we provide a housing 19 which is mounted between the head and tail disks of the reel and serves to guard the carriage from moisture and to keep the line from engagement with the shaft.

Reference numeral 20 indicates the conventional line guide eye which is mounted on the carriage 9 to provide a guide for the winding of the line on the spool 5. The guide eye 20 preferably slides in and is guided by a slot (not shown) in one of the side pillars 4 in the conventional manner.

In Fig. 5, we have shown a modification of the pawl in which two hollow rounded support elements 21 formed as stampings are provided on either side of the operating pawl member 11. The operation of elements 21 is the same as that of the blocks or supports 15.

In Fig. 6, we have illustrated a further modification similar to that of Figs. 1 to 4, inclusive, but characterized by the fact that pawl supports or blocks 22 are utilized which are cut away as indicated at 23 to provide an angular space between the operating member 11 and the supports. This construction, it will appear, provides for a free oscillation of operating member 11 with respect to the supports or elements 22 as well as for an oscillating motion of the supports 22 with respect to the socket 10.

In Fig. 7, we show a still further modification characterized by the provision of a cup-like support 24 provided with a slot 25 in which the operating member 11 is guided. The support 24 oscillates in socket 10 on the reversing of the pawl when it reaches the end of the shaft 8. The inoperative face of the operating member 11 rests on the bottom of the support.

Figs. 8 and 9 illustrate a still further modification in which the retaining plate 16 is formed with upwardly struck angled arm-like supports 26 so disposed that they provide guiding elements for the operating member 11. This modification permits the elimination of movable support elements for the operating member 11, yet functions in the same manner as the other modifications, the arm-like supports 26 being received in the socket 10 and furnishing a space therebetween in which the member 11 oscillates. Fig. 9 indicates that the member 11 is provided with only a single shaft engaging face 13. However, it is obvious that if desired a reversible member 11 may be employed, such as is illustrated in Figs. 2, 4, 5 and 7.

The operation of our pawl assembly with respect to the traversing shaft 8 will be apparent. An exceedingly free motion results at the extreme ends of the shaft when the reversal of the travel is taking place, due to the freedom of oscillation of operating member 11 in socket 10. Binding of the moving parts is completely eliminated. Further, the moving elements are retained within a closed chamber, thus removing the possibility of damage thereto. The parts are all economical to produce and easily assembled.

We have illustrated and described our improvements in embodiments which we have found very practical. We have not attempted to illustrate or describe other embodiments or adaptations as it is believed this disclosure will enable those skilled in the art to embody or adapt our improvements as my be desired.

Having thus described our invention, what we claim as new and desire to secure by Letters Patent, is:

1. The combination with a reel having a reversely threaded line guide carriage traversing shaft, of a carriage operatively associated therewith and provided with a pawl socket, a reversible pawl having a plurality of shaft engaging faces disposed in said socket for oscillating movement therein, and supporting members disposed in said socket at opposite sides of said pawl and with which the pawl is rockingly engaged, said supporting members having rounded outer surfaces to permit oscillation thereof in said socket.

2. The combination with a reel having a reversely threaded line guide carriage traversing shaft, of a carriage operatively associated therewith and provided with a pawl socket, a reversible pawl in the form of a relatively flat plate having a plurality of shaft engaging faces, said pawl being disposed in said socket for oscillating movement therein, and supporting members disposed in said socket at opposite sides of said pawl and with which the pawl is rockingly engaged at its sides to guide the pawl for oscillation in the socket.

3. The combination with a reel having a reversely threaded line guide carriage traversing shaft, of a carriage operatively associated with said shaft and having a pawl socket, a reversible pawl having a plurality of shaft engaging faces disposed in said socket for oscillating movement, and a retaining plate and means to secure it to said carriage, said plate having struck-up angled arms received in said socket to engage the sides of and guide said pawl in the oscillation thereof.

4. The combination with a reel having a reversely threaded line guide carriage traversing shaft, of a carriage operatively associated with said shaft and having a pawl socket, a reversible pawl having a plurality of shaft engaging faces disposed in said socket for oscillating movement, and a retaining plate and means to secure it to said carriage, said plate having struck-up arms received in said socket to engage the sides of and guide said pawl in the oscillation thereof.

5. A pawl assembly comprising a central operating member and a guide block on either side of said member, said blocks being convexly rounded internally at a point adjacent and in contact with the member and externally throughout at a point more remote from said member, said blocks and member when assembled being adapted to oscillate in a pawl socket.

6. A pawl assembly comprising an oscillatable operating member, and guide means for said member including a plate-like element having guide arms disposed at the sides of said member, said arms each including portions disposed at an angle to one another and diverging from a medial portion adjacent the axis of oscillation of the operating member, said diverging portions limiting the motion of said member in the oscillation thereof.

SAMUEL G. RUSSELL.
EARLE D. CLICKNER.